United States Patent [19]

Greer

[11] 4,182,545
[45] Jan. 8, 1980

[54] OPTICAL COUPLER SYSTEM

[75] Inventor: Milton O. Greer, Melbourne, Fla.

[73] Assignee: Harris Corporation, Cleveland, Ohio

[21] Appl. No.: 801,042

[22] Filed: May 27, 1977

[51] Int. Cl.² .............................................. G02B 5/14
[52] U.S. Cl. .................................. 350/96.20; 250/227
[58] Field of Search ............... 350/96.15, 96.20, 96.21; 250/551, 227; 357/19

[56] References Cited

U.S. PATENT DOCUMENTS

| | | | |
|---|---|---|---|
| 3,790,791 | 2/1974 | Anderson | 250/551 |
| 3,910,678 | 10/1975 | McCartney et al. | 350/96.21 |

FOREIGN PATENT DOCUMENTS 2034344  1/1972  Fed. Rep. of Germany ........ 350/96.15

*Primary Examiner*—Rolf G. Hille
*Attorney, Agent, or Firm*—Craig and Antonelli

[57] ABSTRACT

An optical coupler system having two optical elements mounted adjacent one another with mutually confronting surfaces, and an optically clear elastomer interposed therebetween in abutment with the confronting surfaces. A method of assembling an optical coupler system is also disclosed comprising the steps of providing an optically clear elastomer, positioning an end of an optical fiber adjacent the elastomer, pressing the optical fiber end against the elastomer to form an elastomer surface depression from which the optical fiber projects, and holding the optical fiber end in place in pressure contact against the elastomer within the elastomer surface depression.

4 Claims, 3 Drawing Figures

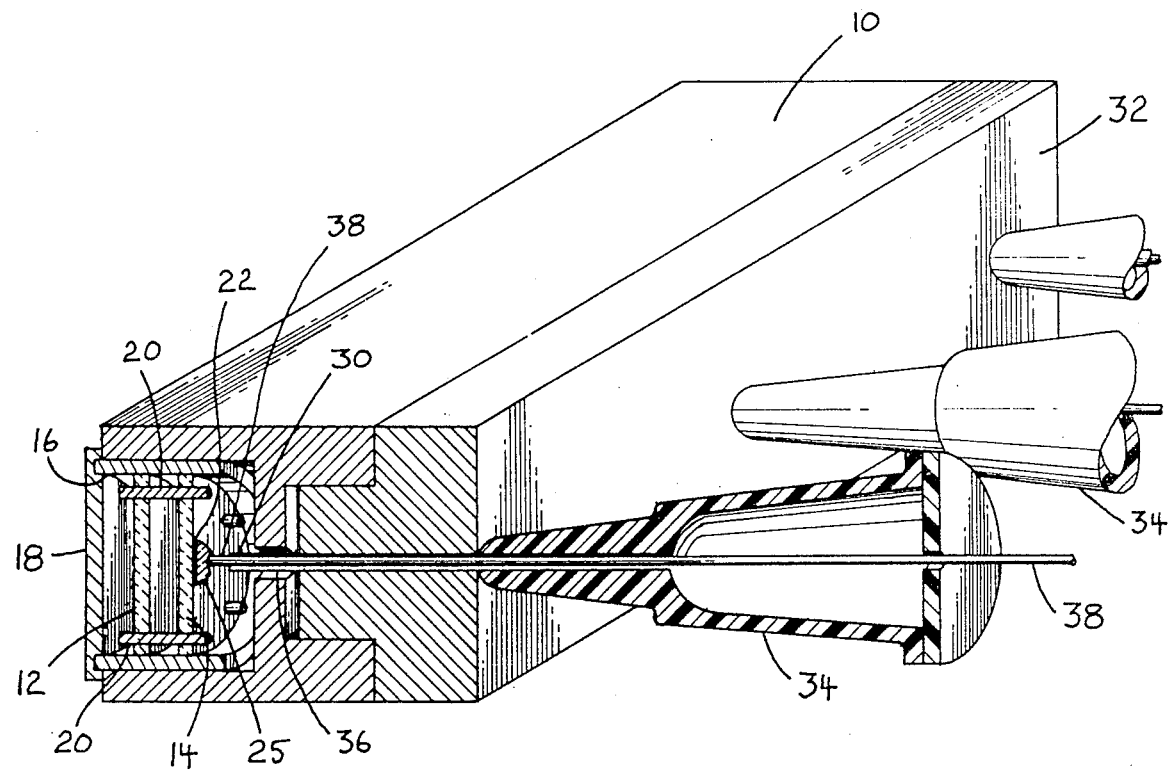
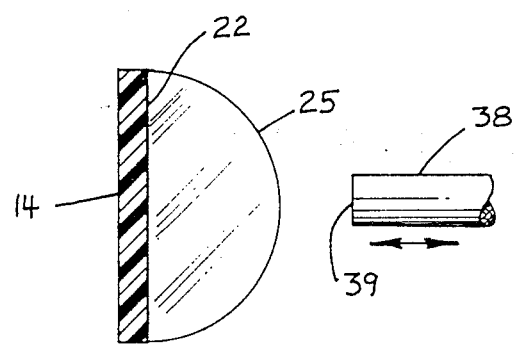 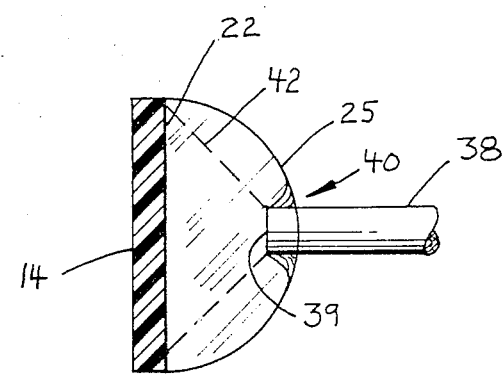

OPTICAL COUPLER SYSTEM

BACKGROUND OF THE INVENTION

This invention relates to optical coupler systems and to methods of assembling such systems.

Optical systems today commonly have a need for optically coupling one solid optical element with another. Normally, it is important that there be little, if any, loss of radiant energy at the interface of the two elements. For example, where light is transmitted through a series of structurally independent optical fibers or waveguides, any loss of radiant energy between adjacent elements is cumulative and can thus quickly limit light transmission efficiency. Similarly, where optical devices have multiple layered elements, such as where scintillants are coupled with photomultipliers, or where the ends of optical waveguides are coupled with transducers such as photodetectors, it is equally important that coupling efficiency be maximized.

Due to the fact that optical fibers are extremely small, it is difficult to couple the elements together by direct contact with any appreciable degree of coupling efficiency. In practice it is too difficult to form and align such fibers with their mutually confronting surface both planar and in parallel, flush abutment. This can be even more difficult to achieve where the mating surface of optical elements are curved.

This has lead to the development of structurally independent coupling materials which are interposed between confronting surfaces of the optical elements. For example, in U.S. Pat. No. 3,457,000 an optically clear adhesive is suggested to improve coupling efficiency. The July/August 1975 issue of the Bell System Technical Journal has suggested the use of a gel. Various fluids have also been proposed. For example, in U.S. Pat. No. 3,768,146 a drop of glycerine having an index of refraction of 1.47 is used for coupling together two optical fibers having a fiber core with an index of refraction of 1.62. In U.S. Pat. No. 3,963,308 an index matching liquid such as cinnemaldehyde or a silicon polymer solid is proposed. U.S. Pat. No. 3,933,678 teaches an organosilicon, greaselike compound having good light shear stability for assembling a scintillant to a photomultiplier. In United Kingdom Pat. No. 1,017,354 glass is used as a structurally independent element coupling two optical fiber ends together. Variable couplers having a changeable index of refraction have also been suggested in U.S. Pat. No. 3,976,358 in the form of a semiconductive material GaAs or AaAlAs. In the foregoing cases mechanical holding means have been required for holding the optical elements and coupler together as an assembly.

Though the just described optical couplers have been capable of coupling together two or more optical elements, they have not been without manifest deficiencies and limitations. For example, where the coupler is a rigid material the optical elements or the coupler itself may need to be momentarily heated during assembly to cause a flow and melting together of adjacent materials. Without such the provision of the structurally independent coupler, which actually serves to double the number of interface junctions, can sometimes actually decrease coupling effectiveness. Where liquids are utilized they can be difficult to apply with efficiency and reliability. The use of greases and adhesives is also difficult to use in properly measured quantities without leaving air gaps or waste.

Accordingly, it is a general object of the present invention to provide an improved optical coupler system.

Another general object of the present invention is to provide an improved method of assembling an optical coupler system.

More specifically, it is an object of the invention to provide an optical coupler system by which coupling may be effected without substantial loss of radiant energy from the coupler assembly.

Another object of the invention is to provide an optical coupler system in which an optical element can be repeatedly coupled and uncoupled without coupler destruction or injury.

Another object of the invention is to provide a method of assembling an optical coupler system of the type described which may be easily practiced without need for precision formation or alignment of the interfacing surfaces of the optical elements.

SUMMARY OF THE INVENTION

In one form of the invention an optical coupler system is provided having two optical elements mounted adjacent one another with mutually confronting surfaces, and a solid resilient optically clear material interposed between and in abutment with the confronting surfaces providing an optical coupler between the two optical elements. Preferably, this material is an elastomer.

In another form of the invention an optical coupler system is provided comprising a photodetector, an optically clear elastomer bonded to the photodetector, and means for releasibly holding an end of an optical waveguide in abutment with a surface of the optically clear elastomer distal the photodetector. So constructed, light emitted from the waveguide end may be transmitted through the optically clear elastomer and onto the photodetector with minimal coupling loss.

In another form of the invention a method is provided for assembling an optical coupler system which comprises the steps of providing an optically clear elastomer, positioning an end of an optical fiber adjacent the elastomer, pressing the optical fiber end against the elastomer to form an elastomer surface depression from which the optical fiber projects, and holding the optical fiber end in place in pressure contact against the elastomer within the elastomer surface depression.

In yet another form of the invention a method is provided for assembling an optical coupler system which comprises the steps of curing a resinous body in situ upon the surface of a first optical element to form an optically clear elastomer bonded to the first optical element with a cured dry surface projecting therefrom, and mounting a second optical element in elastomer deforming pressure engagement with the elastomer cured dry surface.

BRIEF DESCRIPTION OF THE DRAWING

FIG. 1 is a perspective view, in cross-section, of an optical coupler system embodying principles of the invention which may be utilized in practicing a method of the invention.

FIG. 2 is a side elevational view of the optical coupler element of the system shown in FIG. 1 with an end of an optical fiber shown positioned adjacent thereto.

FIG. 3 is another side elevational view of the optical coupler element of the system shown in FIG. 1 with the end of an optical fiber shown in coupling engagement with the coupler element.

DESCRIPTION OF THE PREFERRED EMBODIMENTS

With reference now to the drawing there is illustrated an optical coupler system comprising an aluminum block 10 in which a series of photodetectors are mounted such as type PD321 marketed by the Merit Corporation. Each photodetector is seen to comprise a pair of mutually spaced, disc-shaped dielectric substrates 12 and 14 mutually spaced by a set of pins 20 mounted within a tubular housing 16 capped with a disc-shaped metallic base plate 18. An unshown integrated circuit is mounted upon the substrate 12. A photodetector 22 overlays the surface of substrate 14 distal the substrate 12 and is connected by unshown connectors to the integrated circuit and to the exterior of the photodetector through base plate 18.

With continued reference to the drawing a quantity of a hemispherically shaped material 25 is seen to be mounted atop the surface of the photodetector 22. This material has the property of being solid, resilient and optically clear. As used herein "optically clear" means that the material transmits at least 90% of incident light therethrough without scattering. In addition, the index of refraction of the material should also approximate that of the optical elements to be coupled thereto. The preferred material having these properties is an elastomer material.

The elastomer is preferably mounted to the surface of the photodetector by curing it in situ. This may be done through the use of an elastomer formed by a two part epoxy resin. One preferred elastomer is formed by mixing the semiconductor coating marketed by the Dow Corning Company under its number R-6103 with a curing resin and then placing a nodule of the mixed resin on the surface of the photodetector and allowing it to cure. As the elastomer cures it becomes bonded to the planar surface of the photodetector while surface tension causes its distal surface to become rounded in its relaxed state as it dries and becomes elastic. Following formation of the elastomers the photodetectors are mounted to block 10 by press-fitting the housings 16 within a block recess.

Next, the end portions of a gang of optical fibers such as DuPont de Nemours Crofon light guides are prepared for coupling. For this a set of conventional hypodermic needles 34, which have the points removed, are mounted to another aluminum block 32 with a hollow 23 gauge needle 30 snugly seated within a block passageway through which an optical fiber 38 extends. The block 32 is then slid into a keyway of block 10. The fiber optic waveguides are positioned so as to be brought into deforming pressure contakt with the elastomer 25 when end surfaces of block 32 contact those of block 10. The property of the elastomer being resilient permits a depression to be formed therein which forms a seat for the end of the optical fiber. As shown in FIG. 3 this depression is formed at a generally central location on the spherical surface of the elastomer. An aperture 36 is formed in the block 10 to permit passage of the ends of needle 30 and optical fiber 38 into the region of the elastomer. In this manner as shown in FIG. 3, a surface depression 40 is formed in the elastomer out of which the optical fiber 38 projects. As also shown in FIG. 3, the end 39 of the optical fiber so positioned in pressure contact with the elastomer insures that all portions of a beam of light 42 emitted out of the end of the optical fiber impinge upon the surface of the photodetector. If desired, block 32 may subsequently be removed from block 10 thereby effecting a decoupling of the optical fiber from the elastomer and photodetector. When this occurs the elastomers quickly return to their initial rounded configuration as shown in FIG. 2 ready to receive another set of optical fibers in subsequent coupling operations.

We thus see an optical coupler system is provided by which two or more optical elements may be readily coupled together with a very high degree of coupling efficiency. Though the elastomer was permanently bonded to one of the optical elements in the just described embodiment, this is not necessary. For example, a completely round elastomer may be held between two optical fibers which are then converged into deforming engagement with opposite surfaces of the elastomer. Numerous other in-line and off-line coupling arrangements may also be made depending upon the specific application at hand. Other modification, additions and deletions may also, of course, be made without departure from the spirit and scope of the invention as set forth in the following claims.

I claim:

1. A coupler for coupling radiation between an optical fiber and an opto-electronic conversion element comprising a quantity of a solid, hemispherically shaped resilient optically clear material disposed in contact with each of the surface of said conversion element and an end of the optical fiber, the optical fiber being in pressure contact with the resilient material so that a depression is formed at a generally central location on the spherical surface of the material which forms a seat for the end of the optical fiber, whereby all portions of light emitted from the end of said optical fiber impinge upon the surface of said opto-electronic conversion element.

2. The coupler according to claim 1 wherein the material is an elastomer having an index of refraction approximately the same as that of the core material of the optical fiber.

3. An optical coupler system in accordance with claim 1 wherein an end of an optical fiber is releasibly held by a holding means in pressure contact abutment with an elastomer distal surface with sufficient pressure to form a depression in said elastomer distal surface out from which said optical fiber extends.

4. An optical coupler system in accordance with claim 1 wherein said holding means includes a hollow needle through which said optical fiber extends in frictional engagement therewith.

* * * * *